United States Patent
Denkert et al.

(10) Patent No.: US 6,374,117 B1
(45) Date of Patent: Apr. 16, 2002

(54) QUEUE BASED POWER CONTROL SCHEDULING

(75) Inventors: Niklas Denkert; Tomas Lundborg, both of Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/468,882

(22) Filed: Dec. 22, 1999

(51) Int. Cl.[7] ................................. H04B 7/00
(52) U.S. Cl. .......................... 455/522; 455/69
(58) Field of Search ...................... 455/517, 522, 455/69, 70, 73, 422, 450, 455; 370/327, 330, 331, 332, 341

(56) References Cited

U.S. PATENT DOCUMENTS

| | | | |
|---|---|---|---|
| 5,175,867 A | 12/1992 | Wejke et al. | 455/33.1 |
| 5,745,523 A | 4/1998 | Dent et al. | 375/216 |
| 6,167,273 A | * 12/2000 | Mandyom | 455/69 |
| 6,173,162 B1 | * 1/2001 | Dahlman et al. | 455/552 |

FOREIGN PATENT DOCUMENTS

| EP | 0 887 948 | 12/1998 |
|---|---|---|
| WO | WO97/44968 | 11/1997 |

OTHER PUBLICATIONS

Jianming, W., et al., "Performance Evaluation of Wireless Multimedia CDMA Networks Using Adaptive Transmission Control", IEEE Journal on Selected Areas in Communications, vol. 14, No. 9, Dec. 1996, pp. 1688–1697, XP000639631.

Lu, Y., et al., "Integrating Power Control Error Correction Coding, and Scheduling for a CDMA Downlink System", IEEE Jornal on Selected Areas in Communications, vol. 17, No. 5, Jun. 1999, pp. 978–988, XP000830249.

* cited by examiner

Primary Examiner—Thanh Cong Le
(74) Attorney, Agent, or Firm—Burns, Doane, Swecker & Mathis, L.L.P.

(57) ABSTRACT

A method and system for controlling a transmit power level based upon queue delay for packets in a wireless packet data system is described. Packet data throughput can be improved for selected links based upon queue delay, e.g., those data packets which have experienced a lengthy queue delay can be provided with a higher quality link by increasing their transmit power. The determination of whether or not to prioritize data packets through increased transmit power can be made based upon, for example, a subscriber's QoS profile.

23 Claims, 6 Drawing Sheets

QUEUE BASED POWER CONTROL SCHEDULING

BACKGROUND

The present invention relates generally to radiocommunication systems and, more particularly, to techniques and structures for the efficient use of packet data communications in radiocommunication systems.

The growth of commercial communication systems and, in particular, the explosive growth of cellular radiotelephone systems worldwide, has compelled system designers to search for ways to increase system capacity and flexibility without reducing communication quality beyond consumer tolerance thresholds. For example, most early cellular communication systems provided services using circuit-switched technologies. Now, however, mobile calls may be routed in a circuit-switched fashion, a packet-switched fashion, or some hybrid thereof. Moreover, it has become increasingly desirable to couple and integrate mobile cellular telephone networks, for instance a GSM network, to Internet protocol (IP) networks for call routing purposes. The routing of voice calls over IP networks is frequently termed "voice over IP" or, more succinctly, VoIP.

Packet-switched technology, which may be connection-oriented (e.g., X.25) or "connectionless" as in IP, does not require the set-up and tear-down of a physical connection, which is a significant difference relative to circuit-switched technology. This feature of packet data typically reduces the data latency and increases the efficiency of a channel in handling relatively short, bursty, or interactive transactions. A connectionless packet-switched network distributes the routing functions to multiple routing sites, thereby avoiding possible traffic bottlenecks that could occur when using a central switching hub. Data is "packetized" with the appropriate end-system addressing and then transmitted in independent units along the data path. Intermediate systems, sometimes called "routers," are stationed between the communicating end-systems to make decisions about the most appropriate route to take on a per packet basis. Routing decisions are based on a number of characteristics, including, for example: least-cost route or cost metric; capacity of the link; number of packets waiting for transmission; security requirements for the link; and intermediate system (node) operational status.

In packet data communication schemes, access to the system is provided on a random basis using a packet data scheduler disposed in the fixed part of the system. For example, a mobile station carries out a random access within a cellular digital packet data communication system in order to initiate a data transfer session. The random access can be carried out, however, only when the scheduler announces an idle time slot in the downlink. Then the mobile station initiates a transfer (for example by transmitting a BEGIN frame) in the idle time slot. When the cellular digital packet data communication system receives the transfer, it acknowledges receipt of the BEGIN frame to the specific mobile station. This acknowledgment indicates to the mobile station that it has been activated and will later be scheduled to transfer data with the system. If the cellular digital packet data communication system did not receive the initial transfer due to, for example, a collision of packets received from several mobile stations attempting random access at the same time, then the mobiles will retry random access after waiting for some e.g., random, time period.

Once a mobile station has made a successful random access, and is therefore active, it is scheduled by the system to transfer packets on a radio channel. The scheduling can be carried out on basis of the mobile's Quality of Service (QoS) or other widely known methods. With the introduction of new services or applications over packet data systems, for example, real time (RT) services such as VoIP, there will be a large variety of Quality of Service (QoS) demands on the network. Certain users, for example, those utilizing real time voice applications will have a very high demand for the availability of transmission resources, whereas users, for example, who transmit short messages or electronic mail, will be satisfied with a lower availability of transmission resources.

For example, in a UMTS system, there are four proposed QoS classes: the conversational class; streaming class; interactive class; and background class. The main distinguishing factor between these classes is the sensitivity to delay of the traffic. Conversational class traffic is intended for traffic which is very delay sensitive while background class traffic is the most delay insensitive traffic class. Conversational and streaming classes are intended to be used to carry RT traffic flows whereas interactive and background classes are intended to be used to carry Internet applications (e.g., WWW, E-mail, Telnet, FTP, etc.).

Figure 1:
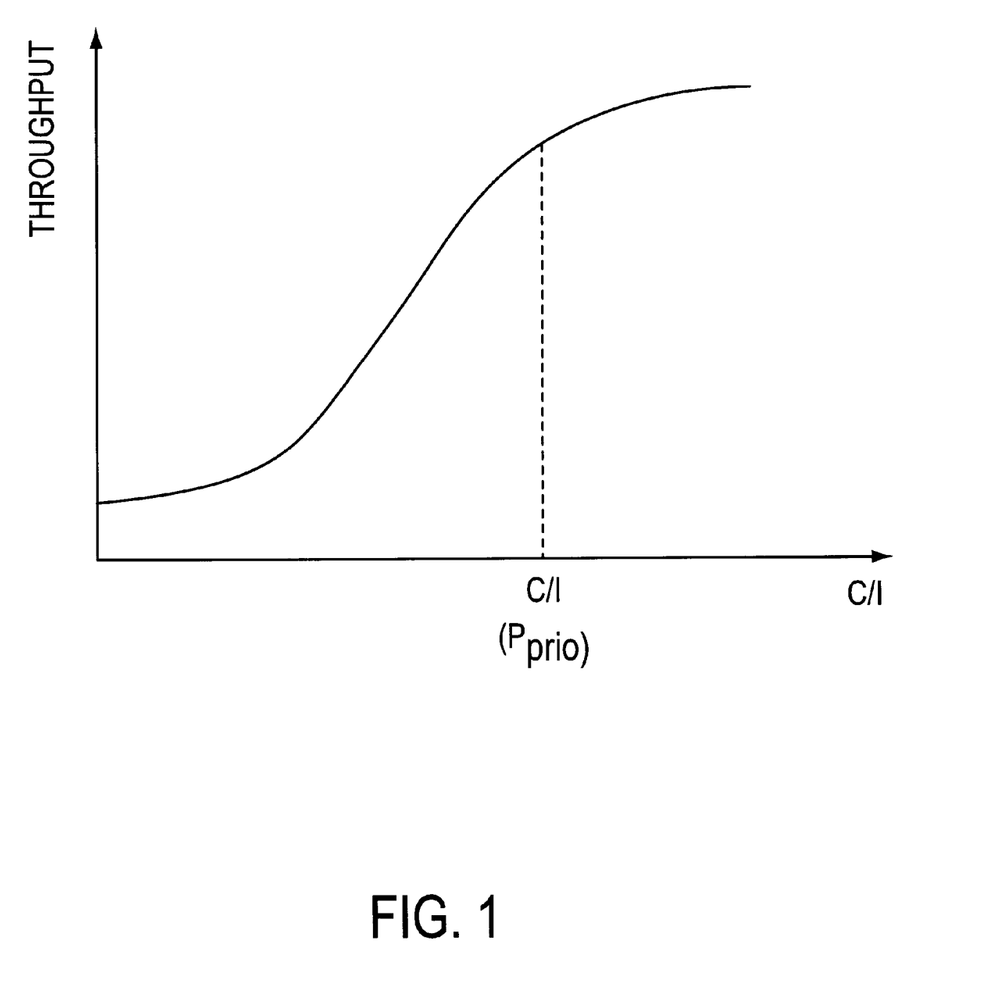
FIG. 1 illustrates a generalized, graphical relationship between throughput and a radio link's carrier-to-interference.

In considering how to accommodate varying QoS requirements in wireless packet data systems, delay constraints are one consideration. For example, a user's subscription may specify a QoS parameter which indicates that, for a particular application, packet delay can be no more than a predetermined number of milliseconds per packet. The packet data system will, under those circumstances, need to have tools to be able to monitor and influence packet delay to provide service at different QoS levels. In wireless packet data systems, channel throughput (and thereby delay) can be adjusted by selecting, for example, an appropriate modulation and coding scheme for a given link quality between the mobile station and the wireless packet data system. An idealized relationship between channel throughput and radio link quality (as represented by the carrier-to-interference (C/I) ratio) is depicted in FIG. 1.

Power control is another technique which may be used to adjust the operation of a radiocommunication system. In conventional, circuit-switched radiocommunication systems, power control was used in conjunction with C/I targets to ramp transmit power up or down for each link in a manner that was intended to globally control link quality. However, in wireless packet data systems, power control becomes more complicated since a single C/I target for all radio links does not exist. Link quality is associated with throughput and, therefore, in order to improve the link quality for a first user who is experiencing poor link quality, it is necessary to lower the quality of a second user's link. From a time perspective, once the second user's link is reduced in quality to improve the quality of the first user's link, it takes longer to transmit a sequence of packets to the second user, e.g., due to the increased need to retransmit packets over the second user's link.

Applicants have discovered that part of the problem with trying to apply conventional power control techniques to packet data systems is that they fail to adapt transmit power as a function of time. In particular, packet data systems have a total transmit delay which is a function of queue delay ($D_q$) which is the amount of time that a packet spends being buffered prior to transmission, retransmission delay ($D_r$) which is the amount of additional time needed to retransmit a packet or portion of a packet that was improperly received, as well as the transmit delay ($D_t$), which is the data rate depending on the selected modulation and/or coding scheme. $D_t$ can be reduced if a higher level modulation and/or a reduced error coding is selected, however this may lead to an increased rate of retransmissions. $D_r$ can, in turn, be reduced if the transmission power is increased. Thus, an optimal balance between $D_t$ and $D_r$ is desirable.

Accordingly, it would be desirable to provide systems and methods for providing enhanced power control in wireless packet data systems.

SUMMARY

The present invention overcomes the above-identified deficiencies in the art by providing a method and system for controlling transmit powers based upon time parameters associated with wireless packet data systems. According to one exemplary embodiment of the present invention, downlink transmit power is adapted based upon a queue time of a data packet. For example, as the queue time of a particular data packet stored in a buffer approaches a threshold time, e.g., that specified by a user's subscription for a particular connection, the transmit power for that packet (as well as other packets associated with that connection) can be increased to reduce the remaining delay associated with receiving that packet at the other end of the connection. This results in a prioritization of the transmission of the data packet and, therefore, a reduction in the delay associated with retransmission.

According to another exemplary embodiment of the present invention, link adaptation can also be adjusted based upon this prioritization. For example, if a data packet is prioritized by providing increased transmit power, then the modulation and/or error correction coding scheme used to process the data packet for transmission can also be changed, e.g., to increase throughput.

BRIEF DESCRIPTION OF THE DRAWINGS

The above objects and features of the present invention will be more apparent from the following description of the preferred embodiments with reference to the accompanying drawings, wherein.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention. For example, the present invention can be applied to any packet data system, e.g., those defined for IS-136 compliant systems or GSM compliant packet data systems, also known as GPRS systems.

Figure 2:
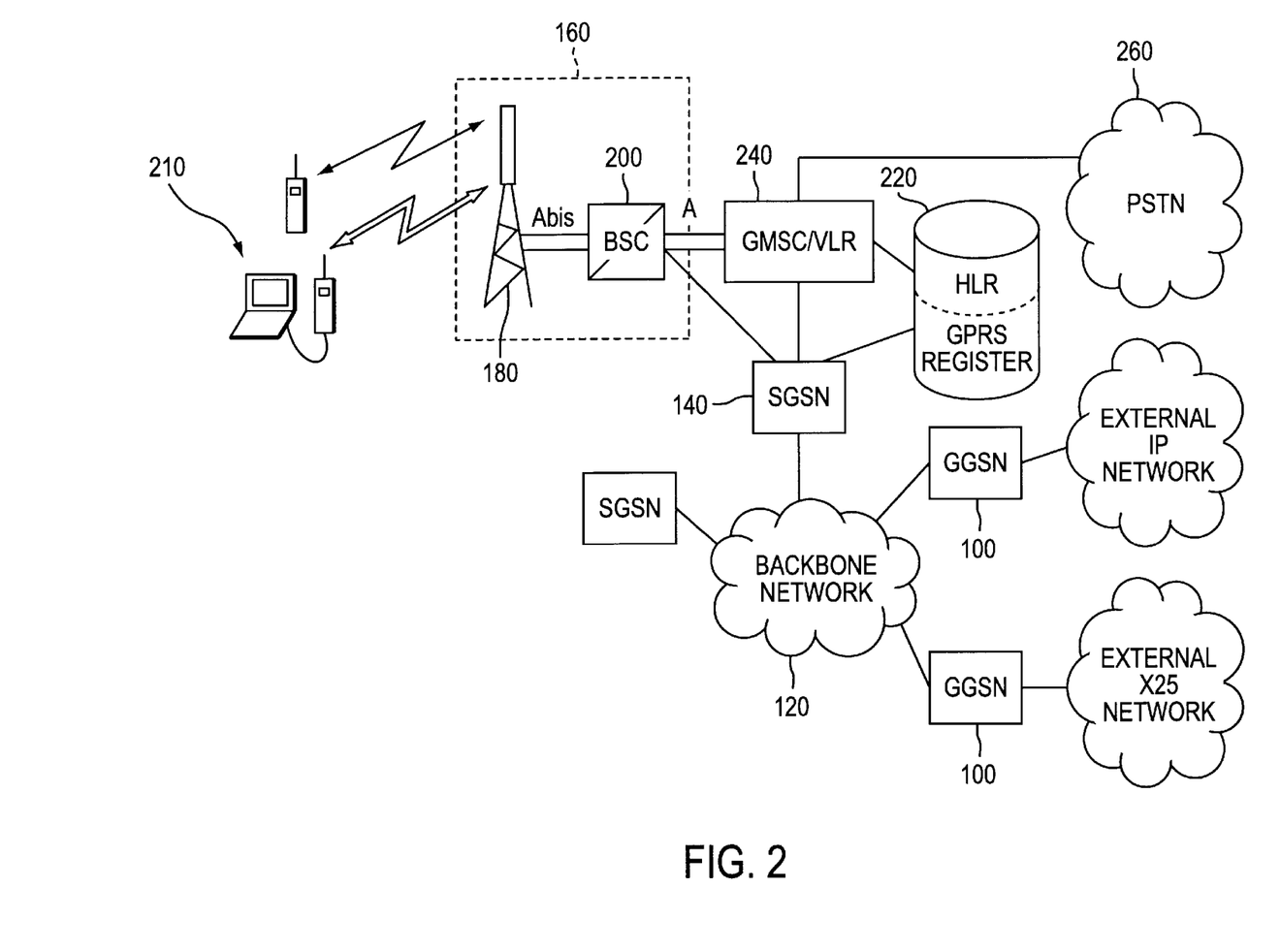
FIG. 2 is a block diagram of a wireless packet data system in which the present invention may be implemented.

An overview of an exemplary GPRS network architecture in which the present invention can be implemented is illustrated in FIG. 2. Data packets from external networks, e.g., the Internet, will enter the GPRS network at a GGSN (Gateway GPRS Service Node) 100. The packet is then routed from the GGSN via a backbone network, 120, to a SGSN (Serving GPRS Support Node) 140, that is serving the area in which the addressed GPRS mobile resides. From the SGSN 140 the packets are routed to the correct BSS (Base Station System) 160, in a dedicated GPRS transmission. Data packets can be buffered in either the SGSN 140 or the BSS 160 for subsequent transmission. The BSS includes a plurality of base transceiver stations (BTS), only one of which, BTS 180, is shown and a base station controller (BSC) 200. The interface between the BTSs and the BSCs are referred to as the A-bis interface. The BSC is a GSM specific denotation and for other exemplary systems the term Radio Network Control (RNC) is used for a node having similar functionality as that of a BSC. Packets are then transmitted by the BTS 180 over the air interface to a remote unit 210 using a selected information transmission rate. This transmission direction (base-to-remote) is commonly referred to as the "downlink".

A GPRS register contains the GPRS subscription data, e.g., including a delay threshold parameter which describes the QoS for which the subscriber associated with remote unit 210 is paying. The GPRS register may, or may not, be integrated with the HLR (Home Location Register) 220 of the GSM system. Subscriber data may be interchanged between the SGSN and the MSC/VLR 240 to ensure service interaction, such as restricted roaming. As mentioned above, the access network interface between the BSC 200 and GMSC/VLR 240 is, in this example, a standard interface known as the A-interface, which is based on the Mobile Application Part of CCITT Signaling System No. 7. The MSC/VLR 240 also provides access to the land-line system via PSTN 260.

As mentioned above, according to exemplary embodiments of the present invention, time parameters are considered in adjusting or controlling transmit power. A first example will now be described with respect to FIG. 3, wherein a fixed delay may be desirable for real time communication services in the wireless packet data network. In this example, transmit power can be determined initially as a function of a power control algorithm 300. The power control algorithm 300 can receive measurement data, e.g., received signal strength, pathloss information, bit error rate data, etc., and can determine an initial transmit power level $P_{pc}$ based on this information. The selection of a specific power control algorithm is beyond the scope of the present invention, however any power control algorithm known to those skilled in the art may be used in block 300.

Figure 3:
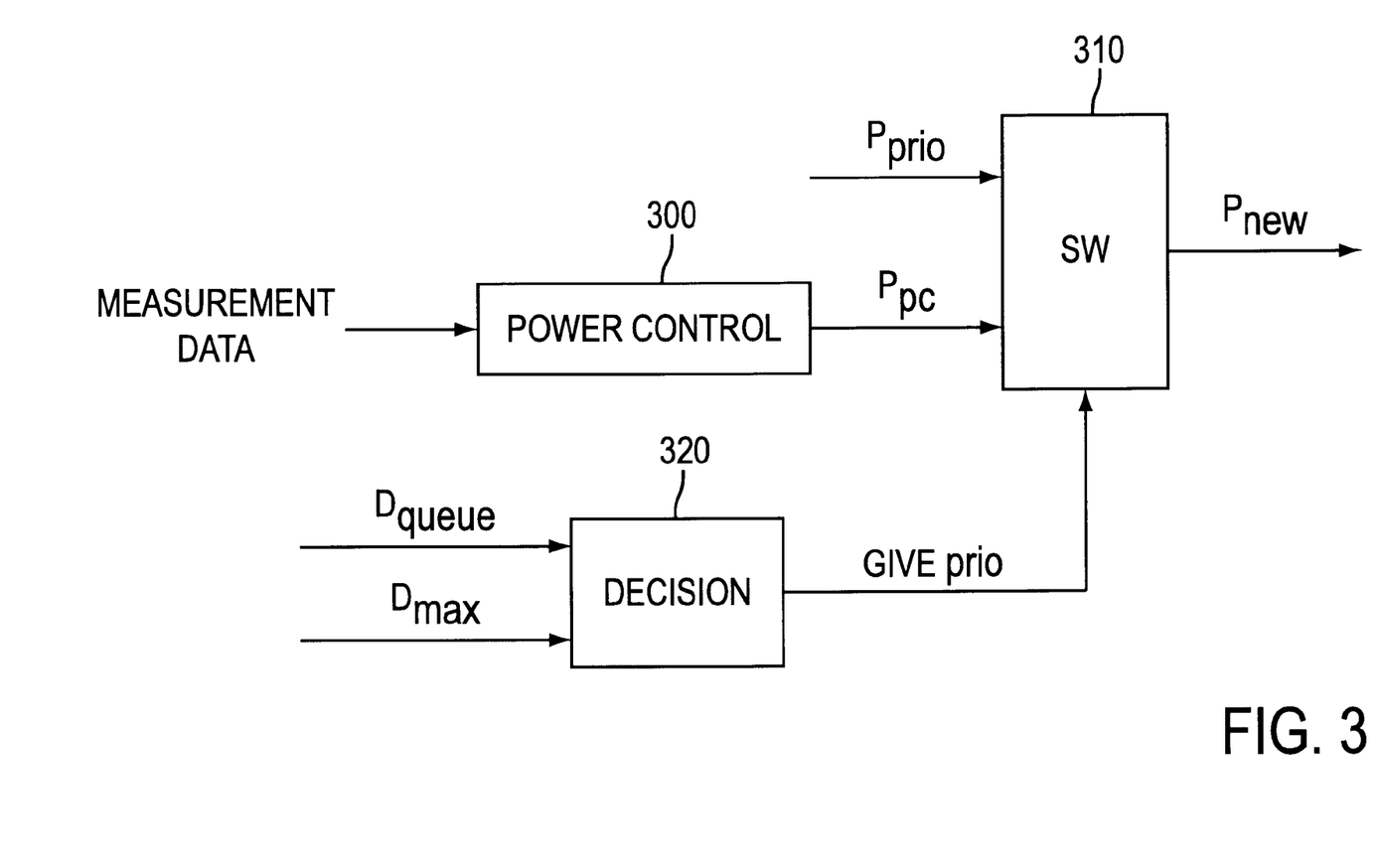
FIG. 3 is a block diagram of an exemplary embodiment of the present invention.

In any event, switch or multiplexor 310 can also have input thereto another possible transmit power $P_{prio}$. The transmit power $P_{prio}$ need not be a maximum transmit power available to the base station transceiver but may be a power level which is less than the maximum transmit power level and which is selected to provide a relatively high level of throughput, see, e.g., FIG. 1.

Either $P_{prio}$ or $P_{pc}$ can be selected by the switch or multiplexor 310 based upon a priority control input. The priority control input can be generated by decision block 320. Decision block 320 can compare the queuing delay ($D_{queue}$) with a delay threshold ($D_{max}$). If the queuing delay is greater than the delay threshold, then the priority control input can be set such that multiplexor 310 selects $P_{prio}$ as the transmit power for the next transmission. Otherwise, if the queuing delay is less than the delay threshold, then the priority control input can be set such that multiplexor 310 selects $P_{pc}$ as the transmit power for the next transmission. This type of queue based power control according to the present invention can be performed for every transmit burst, if transmission is discontinuous, or this adaptation can be performed less frequently. Instead of a switch or multiplexor 310, which have been used here simply to illustrate the present invention, those skilled in the art will appreciate that the power control algorithm 300 can itself be modified to include a weighted variable or alternative value associated with measured or anticipated packet delay, e.g., the power control algorithm can be a function of queuing delay or some other delay variable.

Many variations of this invention will be apparent to those skilled in the art. For example, this invention can be extended to providing a plurality of different priority levels. Whereas the afore-described embodiment depicts a priority ($P_{prio}$) and a non-priority ($P_{pc}$) power level, additional intervening levels of priority may be provided by increasing the power level in one or more increments between $P_{pc}$ and $P_{prio}$.

The delay threshold used in decision block 320 may be fixed for all connections. Alternatively, this threshold may have a value which is varied from connection to connection. If a user subscribes to a service having a certain QoS parameter that is, to some extent, sensitive to packet delay, then the system may calculate a delay threshold value related thereto. For example, if the user has subscribed to an enhanced worldwide web browsing application which guarantees an average packet delay of 100 milliseconds, then the system may select a delay threshold which is less than 100 milliseconds to ensure such an average packet delay.

It may be useful to consider the number of packets to be transmitted as part of the decision process for prioritizing transmission by increasing the transmit power. For example, if there has already been a significant delay in transmitting the packets associated with a particular data connection and a large number of packets remain to be transmitted, then it may be desirable to increase the transmit power to reduce the likelihood that one or more packets need to be retransmitted.

Figure 4:
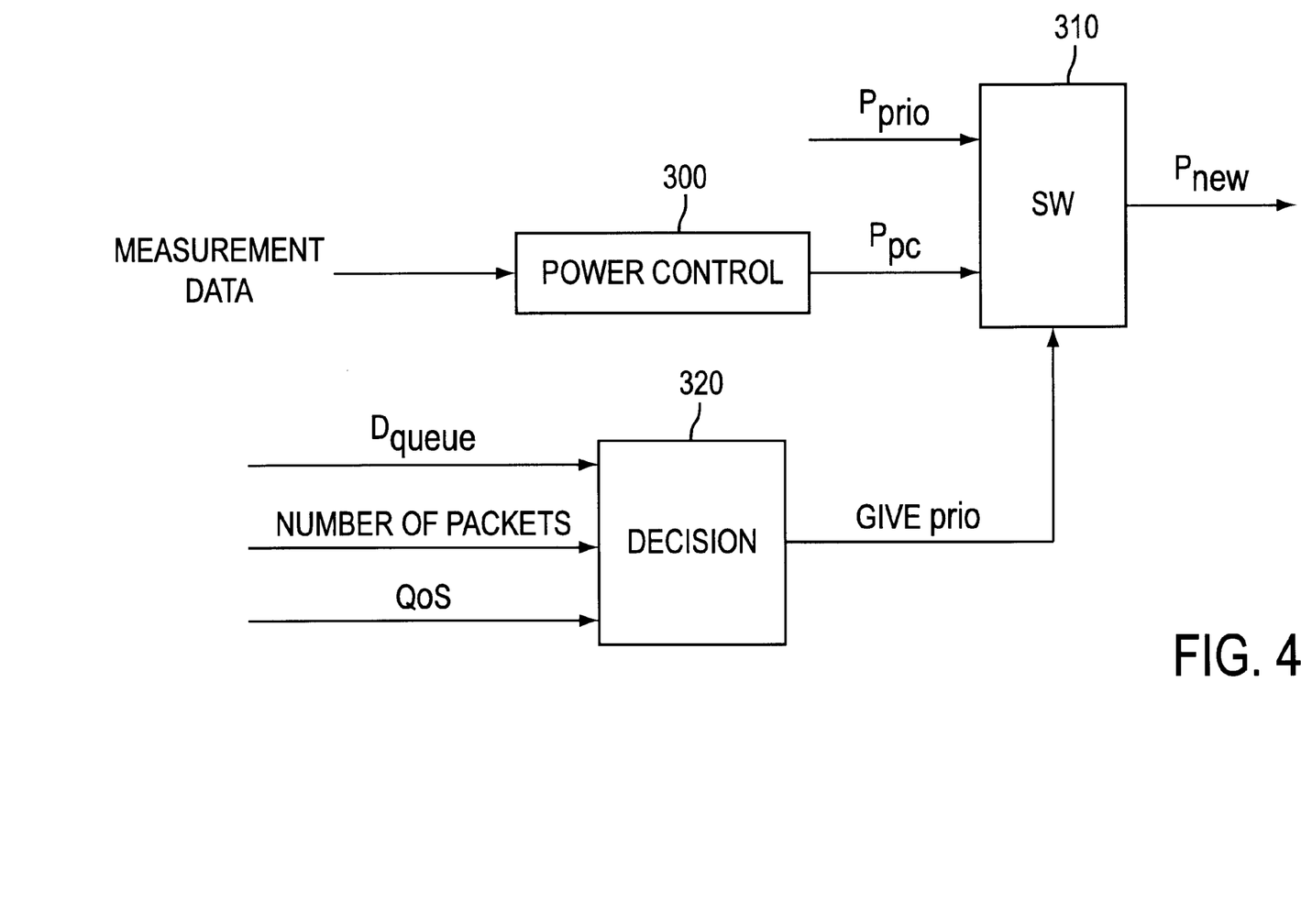
FIG. 4 is a block diagram of another exemplary embodiment of the present invention.

These additional considerations for establishing priority transmission and controlling transmit power are illustrated in the exemplary embodiment seen in FIG. 4. Therein, the same reference numerals are used again to refer to the same functional blocks described above with respect to FIG. 3. In this case, however, instead of the delay threshold ($D_{max}$), a QoS parameter and a number of packets (e.g., those packets which are currently buffered for a particular data connection) are input to the decision block 320 as well as the queue delay ($D_{queue}$). The QoS parameter may, in addition to or as an alternative to aforementioned QoS parameters, be one of a plurality of class attributes defined in a user's subscription or profile. Such classes may include, for example, precedence class, delay class, reliability class, peak throughput class and mean throughput class, any one of which could be input as parameters of a more general decision or power control algorithm.

In addition to power control, techniques according to the present invention can be linked to other signal processing techniques. For example, if a packet is prioritized such that it will be transmitted with greater transmit power than would otherwise be applied, such information can also be passed to link adaptation functionality to select the modulation and/or coding scheme used to transmit that packet. Link adaptation functionality is used to select the modulation and/or error correction coding depending upon variables such as desired bit rate, link quality, etc. Depending on the modulation scheme used by a particular system, the throughput of a packet transmission scheme deteriorates differently as C/I levels decrease. For example, modulation schemes may use a different number of values or levels to represent information symbols, e.g., QPSK is an exemplary lower level modulation (LLM) scheme, while 16QAM is an exemplary higher level modulation (HLM) scheme. LLM schemes are more robust than HLM schemes with respect to noise and interference, i.e., require a lower carrier-to-interference (C/I) level to achieve acceptable received signal quality, since the demodulator can more readily discern modulation changes in LLM schemes. HLM schemes, on the other hand, provide greater user bit rates, e.g., 16QAM provides twice the user bit rate of QPSK, but require higher C/I levels.

In addition to modulation schemes, digital communication systems also employ various techniques to handle erroneously received information, which techniques also affect the bit rate experienced by the user. Generally speaking, these techniques include those which aid a receiver to correct the erroneously received information, e.g., forward error correction (FEC) techniques, and those which enable the erroneously received information to be retransmitted to the receiver, e.g., automatic retransmission request (ARQ) techniques. FEC techniques include, for example, convolutional or block coding of the data prior to modulation. FEC coding involves representing a certain number of data bits using a certain number of code bits. Thus, it is common to refer to convolutional codes by their code rates, e.g., ½ and ⅓, wherein the lower code rates provide greater error protection but lower user bit rates for a given channel bit rate. These coding rates can also be varied by the link adaptation function.

For packets which have been prioritized to be transmitted with higher power levels, the modulation and/or coding can be selected to provide greater throughput. For example, a higher level modulation and/or less error correction coding can be used to process the packet to take advantage of the enhanced link quality being afforded that particular packet, which reduces $D_r$. Alternatively, if it is desirable to reduce the retransmission delay $D_r$, then the modulation and/or coding can be maintained at a current level despite the increased transmit power. In any event, according to this exemplary embodiment of the present invention, it is desirable for a control processor to consider changes in the transmit power level in conjunction with the link adaptation function to use a suitable modulation and/or coding scheme.

Figure 5:
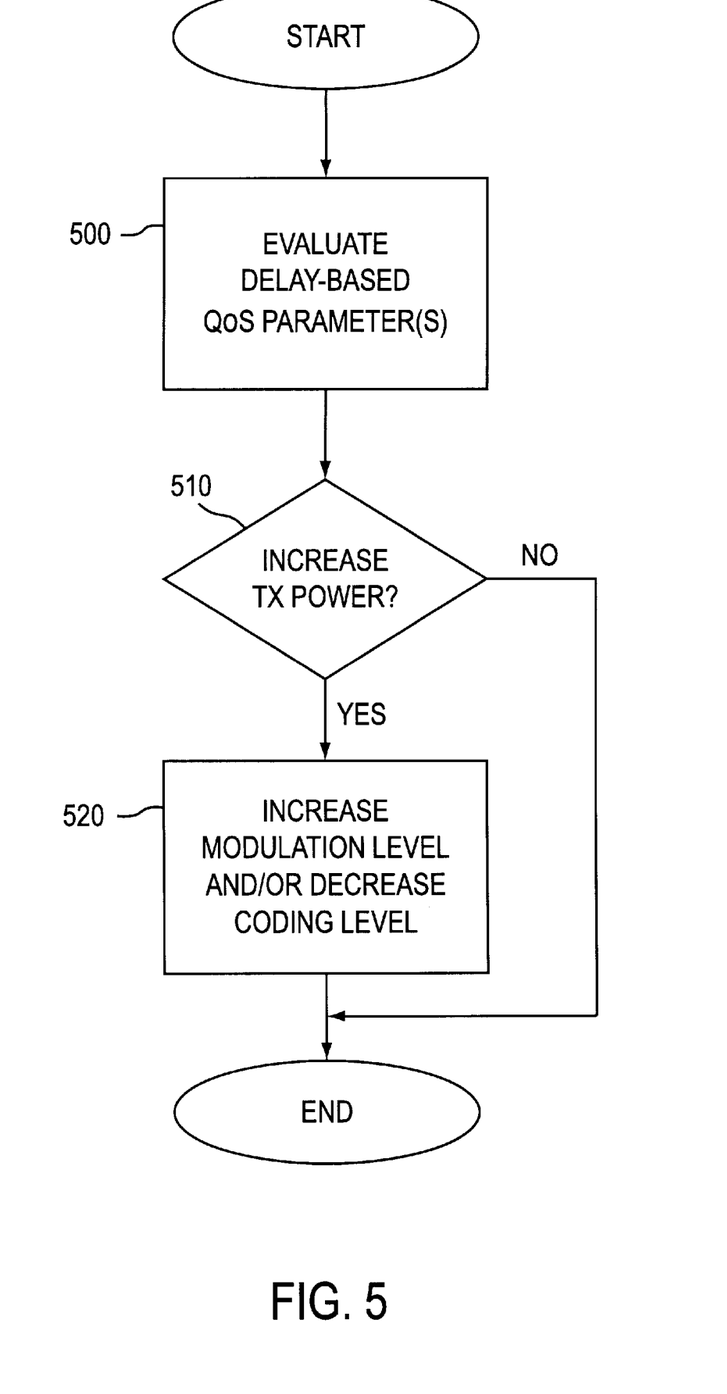
FIG. 5 is a flowchart depicting a method according to an exemplary embodiment of the present invention.

Thus, these exemplary embodiments of the present invention can be summarized as described in the flowchart of FIG. 5. First, the delay-based QoS attributes under consideration can be evaluated at step 500. Then, based upon a result of this evaluation, a decision can be made regarding whether to increase the transmit power (i.e., relative to the transmit power otherwise selected, e.g., based on a C/I based power control scheme) at step 510. If no change is selected, then the process can end. However, if an increase in transmit power is selected, then the flow proceeds to block 520, wherein an increase in the modulation level and/or decrease in the amount of coding provided can be implemented to increase the throughput rate of the payload data, i.e., to reduce $D_r$. Alternatively, if the system decides that it is more important to reduce $D_r$, then the modulation level and/or coding level can be maintained to reduce the need for retransmissions.

Figure 6:
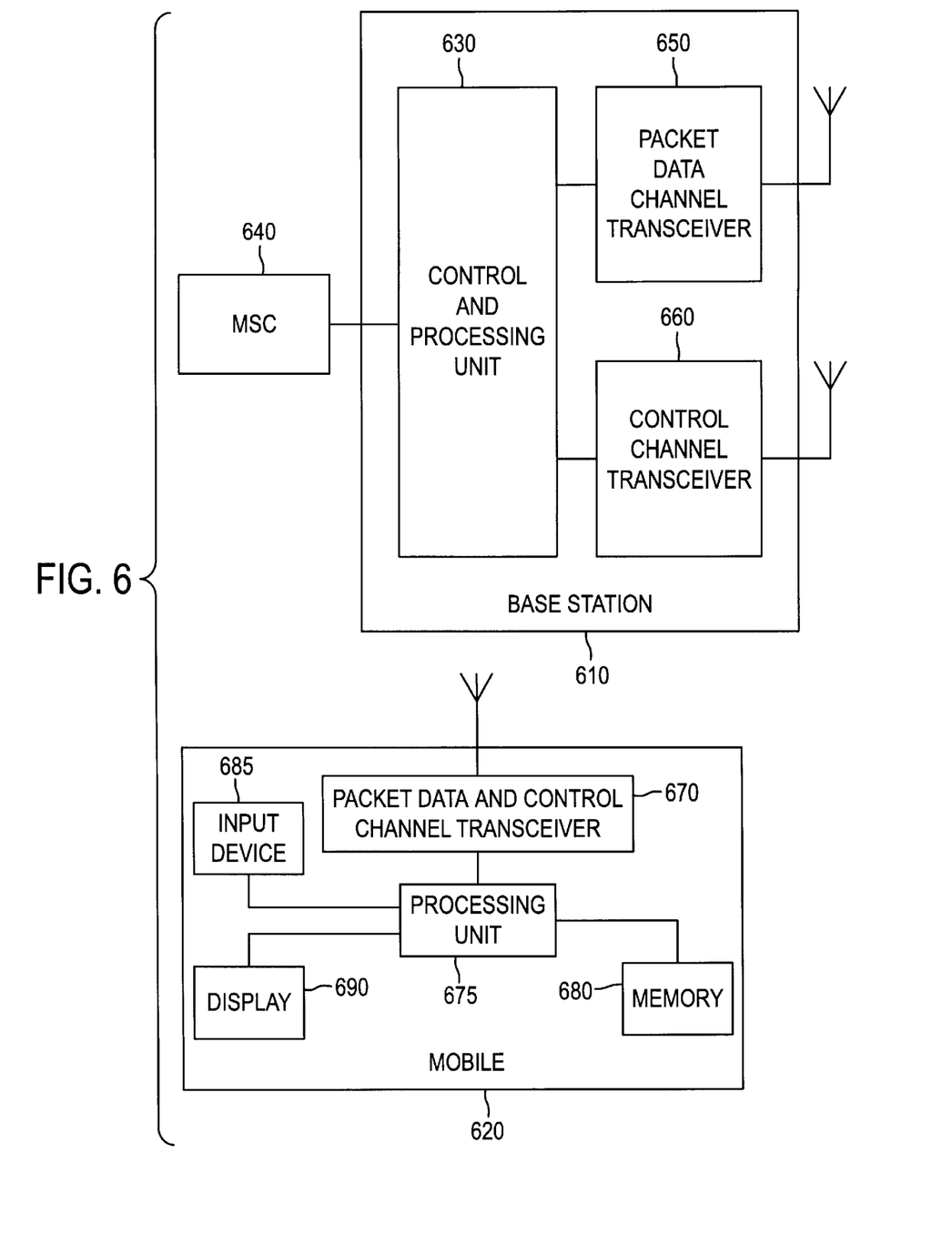
FIG. 6 is a block diagram representation of an exemplary base station and mobile station which can be used to implement the present invention.

To complete the discussion of wireless packet data systems, FIG. 6 represents a block diagram of an exemplary cellular mobile radiotelephone system, including an exemplary base station 610 and mobile station 620. The base station includes a control and processing unit 630 which is connected to the MSC 640 which in turn is connected to the PSTN (not shown). General aspects of such cellular radiotelephone systems are known in the art, as described by U.S. Pat. No. 5,175,867 to Wejke et al., entitled "Neighbor-Assisted Handoff in a Cellular Communication System," and U.S. patent application Ser. No. 07/967,027 entitled "Multi-mode Signal Processing," which was filed on Oct. 27, 1992, both of which are incorporated in this application by reference.

The base station 610 handles a plurality of packet data channels through a packet data channel transceiver 650, which is controlled by the control and processing unit 630. Also, each base station includes a control channel transceiver 660, which may be capable of handling more than one control channel. The control channel transceiver 660 is controlled by the control and processing unit 630. The control channel transceiver 660 broadcasts control information over the control channel of the base station or cell to mobiles locked to that control channel. It will be understood that the transceivers 650 and 660 can be implemented as a single device, like the packet data and control transceiver 670, for use with packet control channels (PCCHs) and packet traffic channels (PTCHs) that share the same radio carrier frequency. The control and processing unit 630 (or a processor internal to each transceiver) can selectively adapt the transmit power of each transceiver as described above, e.g., by varying a gain control command to a power amplifier (not shown) in a manner known to those skilled in the art.

The mobile station 620 receives the information broadcast on a control channel at its packet data and control channel transceiver 670. Then, the processing unit 675 evaluates the received control channel information, which includes the characteristics of cells that are candidates for the mobile station to lock on to, and determines on which cell the mobile should lock. The mobile station 620 also includes an input device 685, such as a numeric keypad, which allows a user to interact with the mobile station. A display device 690, such as an LCD screen, provides a visual display of information to the user. The mobile station typically also includes memory 680.

The foregoing has described the principles, exemplary embodiments and modes of operation of the present invention. However, the invention should not be construed as being limited to the particular embodiments discussed above. While the above-described embodiments were provided using TDMA, one skilled in the art will appreciate that the present invention may be practiced in any of a number of different protocols such as CDMA, FDMA, TDD, etc. Moreover, although the focus of the afore-described embodiments related to adjusting the downlink transmit power, those skilled in the art will appreciate that uplink transmit power can also be varied based upon queue delay. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A wireless packet data system comprising:

a buffer for storing a data packet to be transmitted;

a processor for monitoring a length of time during which said data packet has been stored in said buffer and selectively adjusting a transmit power based on said length of time;

a transceiver for transmitting said data packet at said adjusted transmit power.

2. The system of claim 1, wherein said processor initially determines said transmit power based upon a power control algorithm using measurement data associated with a radio link over which said data packet is to be transmitted.

3. The system of claim 2, wherein said processor compares said length of time with a threshold time and selects one of said initially determined transmit power and an increased transmit power based on a result of said comparison.

4. The system of claim 2, wherein said threshold time is determined based upon a user's subscription profile.

5. The system of claim 1, wherein said processor compares said length of time with a threshold time and selects one of an initial transmit power and an increased transmit power based on a result of said comparison.

6. The system of claim 5, wherein said threshold time is determined based upon a user's subscription profile.

7. The system of claim 1, wherein said processor also adjusts a modulation used to process said data packet based upon said adjusted transmit power.

8. The system of claim 1, wherein said processor also adjusts an error correction coding used to process said data packet based upon said adjusted transmit power.

9. The system of claim 1, wherein said buffer is disposed in a switch.

10. The system of claim 1, wherein said processor adjusts said transmit power for every burst.

11. The system of claim 1, wherein said buffer is disposed in a base station.

12. A method for controlling transmit power in a wireless packet data communication system comprising the steps of:

determining a transmission delay associated with communication of a data packet between a remote station and said system; and selectively adjusting a transmit power associated with transmitting said data packet based on said determined delay.

13. The method of claim 12, further comprising the steps of:

identifying a delay threshold associated with a particular connection between a remote station and said system;

comparing said determined transmission delay with said delay threshold; and increasing said transmit power if said determined delay exceeds said delay threshold.

14. The method of claim 13, wherein said step of identifying further comprises the step of:

retrieving a delay parameter from a user's subscription profile; and calculating said delay threshold based on said delay parameter.

15. The method of claim 12, further comprising the step of:

selecting a modulation scheme based on said adjusted transmit power.

16. The method of claim 12 further comprising the step of:

selecting an error correction coding level based on said adjusted transmit power.

17. The method of claim 12, wherein said step of selectively adjusting occurs for every transmit burst.

18. A system for controlling throughput in a packet radiocommunication system comprising:

means for evaluating a delay-based parameter associated with transmitting a data packet;

means for selectively increasing a transmit power responsive to an output of said means for evaluating; and means for changing at least one of a modulation and an error correction coding scheme when said transmit power is increased.

19. The system of claim 18, wherein said means for changing at least one of a modulation and an error correction coding scheme changes a type of modulation used to process said data packet to a higher level modulation.

20. The system of claim 18, wherein said means for changing at least one of a modulation and an error correction coding scheme changes a type of error correction coding scheme used to process said data packet to a type of error correction coding employing less redundancy.

21. The system of claim 18, wherein said means for evaluating a delay-based parameter compares a queue delay associated with said data packet to a delay threshold.

22. The system of claim 18, wherein said means for evaluating a delay-based parameter takes into account a number of packets to be transmitted.

23. The system of claim 18, wherein said means for evaluating a delay-based parameter takes into account a delay class associated with a quality-of-service profile.

* * * * *